(12) United States Patent
Aamodt et al.

(10) Patent No.: US 6,303,062 B1
(45) Date of Patent: *Oct. 16, 2001

(54) MECHANICAL FASTENER AND METHOD FOR MAKING THE SAME

(75) Inventors: Jennifer M. Aamodt, Woodbury; James G. Berg, Lino Lakes; Peter F. Cullen, Woodbury; Brian T. Hargrett, St. Paul, all of MN (US)

(73) Assignee: 3M Innovative Properties Company, St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/290,751

(22) Filed: Apr. 13, 1999

(51) Int. Cl.$^7$ .................................................. B29C 69/02
(52) U.S. Cl. ............... 264/167; 264/171.13; 264/171.29; 264/172.1; 264/210.2; 264/211.12; 264/220; 264/225
(58) Field of Search ............................... 264/167, 171.13, 264/171.29, 172.1, 173.1, 177.17, 177.19, 210.2, 211.12, 219, 220, 221, 225

(56) References Cited

U.S. PATENT DOCUMENTS

| | | | |
|---|---|---|---|
| 3,192,589 | 7/1965 | Pearson | 24/204 |
| 3,527,629 | 9/1970 | Wylde . | |
| 4,290,832 | 9/1981 | Kalleberg | 156/72 |
| 4,698,274 | 10/1987 | Ausnit et al. . | |
| 4,731,911 | 3/1988 | Gould . | |
| 4,875,259 | 10/1989 | Appeldorn | 24/576 |
| 4,894,060 | 1/1990 | Nestegard | 604/391 |
| 5,077,870 | 1/1992 | Melbye et al. | 24/452 |
| 5,212,853 | 5/1993 | Kaneko | 24/452 |
| 5,242,646 | 9/1993 | Torigoe et al. | 264/219 |
| 5,398,387 | 3/1995 | Torigoe et al. . | |
| 5,505,747 | 4/1996 | Chesley et al. . | |
| 5,607,635 | 3/1997 | Melbye et al. . | |
| 5,679,302 | 10/1997 | Miller et al. . | |
| 5,713,111 | 2/1998 | Hattori et al. . | |
| 5,868,987 | 2/1999 | Kampfer et al. . | |
| 5,902,427 | * 5/1999 | Zinke et al. | 156/73.1 |
| 6,054,091 | 4/2000 | Miller et al. . | |

FOREIGN PATENT DOCUMENTS

| | | |
|---|---|---|
| 42 20 908 A1 | 1/1994 | (DE) . |
| 0 565 750 A1 | 10/1993 | (EP) . |
| 0 702 610 B1 | 5/1997 | (EP) . |
| 0 811 332 | 12/1997 | (EP) . |
| 0 830 930 A1 | 3/1998 | (EP) . |
| 63-80543 | 10/1989 | (JP) . |
| WO 82/02480 | * 8/1982 | (WO) . |
| 89/08201 | 9/1989 | (WO) . |
| 92/19119 | 11/1992 | (WO) . |
| 94/23610 | 10/1994 | (WO) . |
| 98/14086 | 4/1998 | (WO) . |
| 98/30381 | 7/1998 | (WO) . |
| 98/57564 | 12/1998 | (WO) . |

\* cited by examiner

Primary Examiner—Jan H. Silbaugh
Assistant Examiner—Mark Eashoo
(74) Attorney, Agent, or Firm—Melissa E. Buss

(57) ABSTRACT

A mechanical fastener. A preferred embodiment of the invention provides a mechanical fastener including engaging stems having heads with demarcation lines. The present invention also provides a method of making a mechanical fastener that includes placing a layer of heated material on stem ends to soften the stem ends and deforming the softened stem ends into convex heads.

43 Claims, 5 Drawing Sheets

MECHANICAL FASTENER AND METHOD FOR MAKING THE SAME

TECHNICAL FIELD

The present invention relates to a mechanical fastener and method for making the same. The present invention relates more particularly to a mechanical fastener including engaging stems having heads with demarcation lines. The present invention also relates more particularly to a method of making a mechanical fastener which includes placing a layer of heated material on stem ends to soften the stems ends and deforming the softened stem ends into convex heads.

BACKGROUND OF THE INVENTION

Various types of mechanical fasteners are known for holding articles together, such as hook and loop type fasteners or complementary pairs of fasteners that engage with one another. The complementary pairs of fasteners typically have engaging surfaces with patterns of stems having heads. Various methods have been used to head the stems of these fasteners. For example, U.S. Pat. No. 5,077,870, "Mushroom-Type Hook Strip for a Mechanical Fastener," (Melbye et al.), describes a method for forming mushrooms on an array of upstanding stems. A web having an array of upstanding stems made of thermoplastic resin is fed between two calendar rolls. The roll that contacts the stems heats the tips of the stems to a temperature exceeding the flow point of the thermoplastic resin. Briefly, maintaining the tips at this temperature allows molecular disorientation to take place. During this time and upon subsequent cooling, the tips draw back to form uniformly shaped mushroom heads, each having an upper, substantially convex surface and a larger cross section that the original stem.

PCT publication WO 98/57564, "Method and Apparatus for Forming Headed Stem Mechanical Fastener Structure, (Kampfer), published on Dec. 23, 1998, describes a method of deforming the hook head portions of hook elements on a web backing. The hook elements on the web backing are fed into a nip formed between a support surface and an upper heated surface having a durameter hardness of less than 90 Shore A. This upper heated surface compressively engages the hook head causing it to turn down and permanently deform. This increases the uniformity of the hook head elements forming a fiber engaging crook region.

SUMMARY OF THE INVENTION

One aspect of the present invention provides a mechanical fastener. The mechanical fastener comprises a substrate including a first major surface; and a plurality of engaging stems extending from the first major surface of the substrate, where each of the engaging stems includes a convex head, and where each of the heads includes a demarcation line.

In one preferred embodiment of the above fastener, the demarcation lines are generally parallel to one another. In another aspect of this embodiment, the demarcation lines are generally parallel to the first major surface of the substrate. In another preferred embodiment, each of the heads includes an outermost periphery, and the demarcation line is located on the outermost periphery. In another aspect of this embodiment, the periphery is generally circular.

In another preferred embodiment of the above fastener, the plurality of engaging stems comprise polymeric material. In another aspect of this embodiment, the polymeric material comprises a thermoplastic material. In another aspect of this embodiment, the thermoplastic material comprises a polyolefin. In yet another aspect of this embodiment, the polyolefin comprises polypropylene. In yet another preferred embodiment of the above fastener, the substrate and the plurality of engaging stems are integrally formed. In another preferred embodiment of the above fastener, the fastener is an interengaging mechanical fastener. In yet another preferred embodiment of the above fastener, the engaging stem includes a height of 0.005 to 0.2 inches measured from the first major surface of the substrate to the top of the convex head.

Another aspect of the present invention provides a method of forming a mechanical fastener. The method of forming the mechanical fastener comprises the steps of: a) providing a substrate including a first major surface and a plurality of stems extending from the first major surface of the substrate, where each of the plurality of stems includes a stem end; b) placing a layer of heated material on the stem ends to soften the stem ends; and c) deforming the softened stem ends into convex heads.

In a preferred embodiment of the above method, step c) includes compressing the layer of heated material and substrate to deform the softened stem ends into convex heads. In another aspect of this embodiment, step c) further comprises compressing the layer of heated material and the substrate between a nip formed between a first roller and a second roller, where the first roller contacts the substrate opposite the first major surface, and where the second roller contacts the layer of heated material. In another preferred embodiment of the above method, the method fuirther includes the step of: d) stripping the layer of material from the plurality of convex heads. In another aspect of this embodiment, the method further includes the step of cooling the layer of heated material prior to step d).

In another preferred embodiment of the above method, the method further comprises imparting a demarcation line on each of the convex heads. In another aspect of this embodiment, the convex head includes a first portion that contacts the layer of heated material and a second portion that does not contact the layer of heated material, and where the demarcation line on the convex head is at a boundary formed between the first portion and the second portion of the convex head. In another aspect of this embodiment, the method further includes the step of forming a plurality of depressions in the layer of heated material where the layer of heated material contacts the first portion of the convex heads. In yet another preferred embodiment of the above method, step c) comprises deforming the softened stem ends around the plurality of stems to form a plurality of convex heads. In another preferred embodiment of the above method, step b) comprises extruding a layer of material on the stem ends.

In another preferred embodiment of the above method, the layer of material comprises polymeric material. In another aspect of this embodiment, the polymeric material comprises a thermoplastic material. In another aspect of this embodiment, the thermoplastic material comprises a polyolefin. In yet another aspect of this embodiment, the polyolefin comprises polypropylene. In another aspect of this embodiment, the polyolefin comprises polyethylene.

In another preferred embodiment of the above method, the plurality of engaging stems and the convex heads comprise a polymeric material. In another aspect of this embodiment, the polymeric material is a thermoplastic material. In another aspect of this embodiment, the thermoplastic material is a polyolefin. In yet another aspect of this embodiment, the polyolefin comprises polypropylene.

Another aspect of the present invention provides an alternative mechanical fastener. The mechanical fastener comprises a substrate including a first major surface; and b) a plurality of engaging stems extending from the first major surface of the substrate, where each of the engaging stems includes a base attached to the first major surface of the substrate and a tip opposite the base, where each of the engaging stems includes a convex head attached to the tip of the engaging stem, where the convex head includes a lobe adjacent the engaging stem creating a mutual wall between the lobe and the tip of the engaging stem. In a preferred embodiment of this fastener, the mutual wall is at least 5% of the height of the convex head measured from the bottom of the lobe to the top of the convex head.

Another aspect of the present invention provides a composite article. The composite article comprises a) a substrate including a first major surface; and b) a plurality of stems extending from the first major surface of the substrate, c) a layer of material including a first major surface, where the first major surface of the layer of material is melt bonded to the plurality of stems. In a preferred embodiment of the composite article, each of the stems includes a convex head, and each of the heads includes a demarcation line. In another aspect of this embodiment, the convex head includes a first portion that contacts the layer of material and a second potion that does not contact the layer of material, and the demarcation line on the convex head is at a boundary formed between the first portion and the second portion of the convex head. In another aspect of this embodiment, each of the heads includes an outermost periphery, and the demarcation line is located on the outermost periphery.

In another preferred embodiment of the above composite article, the layer of material comprises polymeric material. In another preferred embodiment of the above composite article, the substrate and the plurality of engaging stems are integrally formed. In yet another preferred embodiment of the above composite article, the plurality of engaging stems comprise polymeric material.

Another aspect of the present invention provides an alternative mechanical fastener. This mechanical fastener comprises: a) a substrate including a first major surface; and b) a plurality of engaging ribs extending from the first major surface of the substrate, where each of the ribs includes a convex ridge opposite the substrate, and where each of the convex ridges includes a demarcation line. In a preferred embodiment of this mechanical fastener, each of the convex ridges includes two demarcation lines along the length of each convex ridge. In another aspect of this embodiment, each of the convex ridges includes two demarcation lines located at the widest portion of the convex ridge opposite each other.

In another preferred embodiment of the above mechanical fastener, the demarcation lines are generally parallel to one another. In another aspect of this embodiment, the demarcation lines are generally parallel to the first major surface of the substrate. In another preferred embodiment of the above fastener, the substrate and the plurality of engaging ribs are integrally formed. In another preferred embodiment of the above fastener, the fastener is an interengaging mechanical fastener. In yet another preferred embodiment of the above fastener, the plurality of engaging ribs comprise polymeric material.

Another aspect of the present invention provides a method of forming a mechanical fastener. The method of forming a mechanical fastener comprises the steps of: a) providing a substrate including a first major surface and a plurality of ribs extending from the first major surface of the substrate, where each of the plurality of ribs includes a rib end; b) placing a layer of heated material on the rib ends to soften the rib ends; and c) deforming the softened rib ends into convex ridges.

In a preferred embodiment of the above method, step c) includes compressing the layer of heated material and substrate to deform the softened rib ends into convex ridges. In another aspect of this embodiment, step c) further comprises compressing the layer of heated material and the substrate between a nip formed between a first roller and a second roller, where the first roller contacts the substrate opposite the first major surface, and where the second roller contacts the layer of heated material.

In a preferred embodiment of the above method, the method further comprises the step of: d) stripping the layer of material from the plurality of convex ridges. In another aspect of this embodiment, the method further comprises the step of cooling the layer of heated material prior to step d). In another preferred embodiment of the above method, the method further comprises imparting a demarcation line on each of the convex ridges. In yet another preferred embodiment of the above method, step b) comprises extruding a layer of material on the rib ends.

Another aspect of the present invention provides an alternative mechanical fastener. This mechanical fastener comprises: a) a substrate including a first major surface; and b) a plurality of engaging stems extending from the first major surface of the substrate, where each of the engaging stems includes a convex head, where each of the convex heads includes a first portion at the top of the head and a second portion at the bottom of the head, and where the first portion of the head is smoother than the second portion of the head.

In a preferred embodiment of the above fastener, each of the heads includes a demarcation line and where the demarcation line is the boundary between the first portion of the head and the second portion of the head. In another aspect of this embodiment, the demarcation lines are generally parallel to one another.

In another preferred embodiment of the above fastener, each of the heads includes an outermost periphery, and where the demarcation line is located on the outermost periphery. In another preferred embodiment of the above fastener, the plurality of engaging stems comprise polymeric material. In another aspect of this embodiment, the polymeric material comprises a thermoplastic material. In yet another aspect of this embodiment, the thermoplastic material comprises a polyolefin. In another aspect of this embodiment, the polyolefin comprises polypropylene. In another preferred embodiment of the above fastener, the substrate and the plurality of engaging stems are integrally formed. In yet another preferred embodiment of the above fastener, the fastener is an interengaging mechanical fastener.

BRIEF DESCRIPTION OF THE DRAWINGS

The present invention will be further explained with reference to the appended Figures, wherein like structure is referred to by like numerals throughout the several views, and wherein.

DETAILED DESCRIPTION OF THE INVENTION

Figure 1:
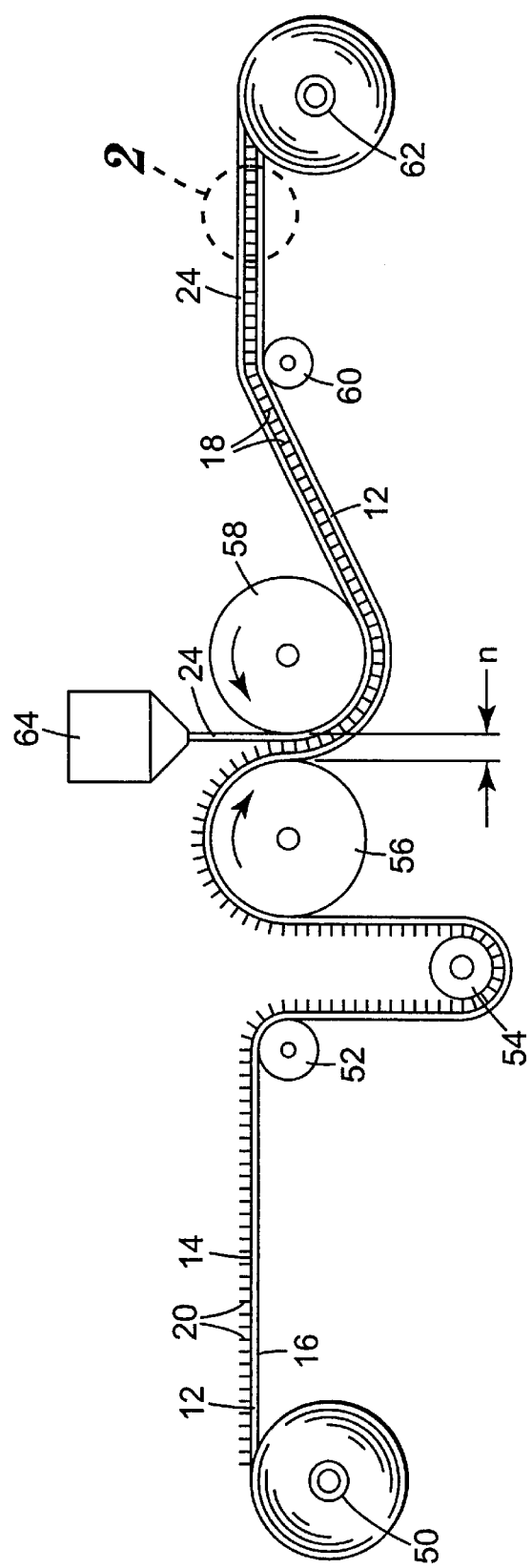
FIG. 1 is a schematic illustration of an apparatus and a method of making the mechanical fastener of the present invention.

FIG. 1 is a schematic illustration of a preferred apparatus and method of making the mechanical fastener of the present invention. The preferred apparatus includes a series of rollers 50, 52, 54, 56, 58, 60, 62, and an extruder 64. The unwind roller 50, idler roller 52 and idler roller 54 convey a substrate 12 including a plurality of stems 20 to a nip formed between a first roller 56 and a second roller 58. The substrate 12 includes a first major surface 14 and a second major surface 16 opposite the first major surface. The stems 20 extend from the first major surface 14. Preferably, the substrate 12 and stems 20 comprise a polymeric material. More preferably, the substrate 12 and stems 20 comprise a thermoplastic material. The stems may be distributed in any manner over the entire substrate 12 or over only a portion of the substrate 12. The stems 20 may be lined up with one another or may be offset from one another, and may be in any pattern, arrangement or density. Stems 20 may be any desired shape, size or form.

Rollers 56, 58 are rotatable and form a nip n. The substrate 12 including the stems 20 is fed at through nip n. Just prior to the substrate 12 entering the nip n, a layer of heated material 24 is extruded from an extruder 64 onto the tips of the stems 20. Preferably, the layer of material 24 is a polymeric material. More preferably, the layer of material is a thermoplastic material. The layer of material 24 is at a temperature high enough to soften the ends of the stems 20. Heads 22 are then formed on the stems 20 by deforming the softened ends into heads 22 as the substrate 12, stems 20 and layer of material 24 pass through nip n. The heads 22 and stems 20 form engaging stems 18.

As the substrate 12, stems 20 and layer of material 24 pass through nip n, the second major surface 16 of the substrate 12 contacts the first roller 56 and the layer of heated material 24 contacts the second roller 58. The heads 22 are formed by heating and compressing the tops of the stems in the nip n formed between first roller 56 and second roller 58. The nip n between the first roller 56 and second roller 58 assists in forcing the softened stem ends over and around the periphery of the tips of the stems 20 to form the heads 22. The layer of material 24, substrate 12 and engaging stems 18 form an intermediate article 48 in nip n. Preferably, as the intermediate article 48 exits nip n, the intermediate article 48 separates from first roller 56 and continues with second roller 58 for approximately half of a rotation. The intermediate article 48 is then conveyed past idler roller 60 and wrapped unto the windup roller 62. Instead of rotating with the second roller 58 after the nip n, the intermediate article may alternatively exit the nip n parallel to the nip.

Preferably, extruder 64 is positioned directly over the nip n formed between the first and second rollers 56, 58. Alternatively, extruder 64 may be positioned above the first roller 56 to place the layer of heated material 24 on the stems 20 earlier than just prior to the nip n. This alternative extruder position allows the heated layer of material 24 more time to soften the ends of the stems 20 before being compressed in nip n. Preferably, the layer of material 24 is extruded such that the layer of material 24 extends across the entire width of the substrate 12. The first and second rollers 56, 58 are preferably kept at constant temperatures. Preferably, the temperatures of the first roller 56 and the second roller 58 are in the range of 50° to 225° F. (10 to 107° C.). More preferably, the temperature ofthe first roller 56 is in the range of 100° to 225° F. (38° to 107° C. ) and the temperature of the second roller 58 is 80to 200° F. (27° to 93° C.).

The width of the nip n is set to achieve the desired height of the final engaging stems 18. The desired height of the fmal engaging stems is also effected by the original stem height, the compositions of stem 20 and the layer of material 24, the thickness and temperatureofthe layer of heated material 24, line speed of the substrate 12, temperatures of the first and second rollers 56, 58 and compression pressure between the first and second rollers 56, 58. These can be selected by one of skill in the art with the benefits of the teachings of the present invention to provide the desired engaging stem 18. Preferred ranges for these factors for preferred embodiments are included in the examples below.

The composite article of the substrate 12, stems 20, and layer of material 24 may be produced in long, wide webs that may be wound up on windup roller 62 as rolls for convenient storage and shipment.

Figure 2:
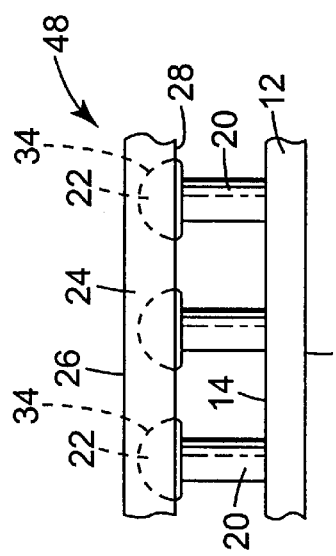
FIG. 2 is an enlarged side view of an intermediate article shown in FIG. 1.

FIG. 2 is an enlarged view of the intermediate article 48. The layer of material 24 includes a first major surface 26 and a second major surface 28 opposite the first major surface 26. The layer of material 24 softened the tips of the stems 20 and deformed the softened stem ends into convex heads 22. "Convex" is used herein to describe any contour that slopes away from a plane. For example, the first portion 34 of the head 22 slopes away from the first major surface 26. The heads 22 are illustrated as having a circular cross-section, however this is not required. When layer of material 24 and stems 20 are compressed in nip n, the softened stem ends may form other cross-sectional shapes, such as ovals. As a result of the softened stem ends forming heads 22, the original height of the stems 20 is reduced.

Figure 3:
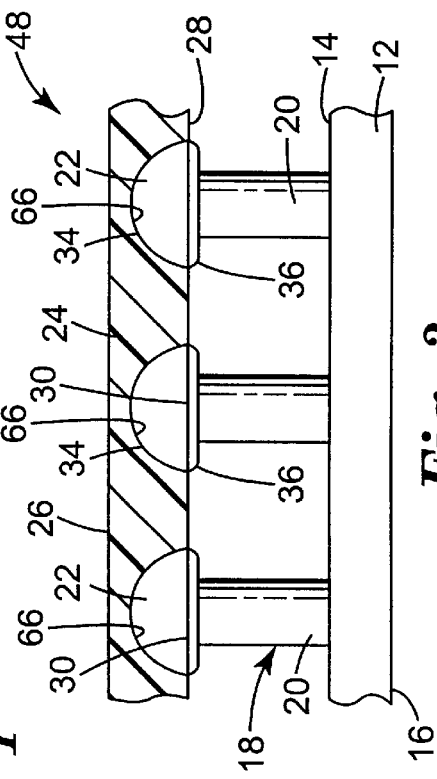
FIG. 3 is a partial cross-sectional view of the intermediate article shown in FIG. 2.

FIG. 3 is a partial cross-section of the article 48 of FIG. 2, which is convenient for discussing the demarcation lines 30. The heads 22 are formed on the stems 20 as the layer of material 24 softens the stem ends and as the substrate 12, stems 20, and layer of material 24 are compressed between nip n. As the material from the softened stem ends is pushed down over the stem 20 by the layer of material 24 in nip n, the second major surface 28 of the layer of material 24 forms a first portion 34 located at the top of the head which is smooth and leaves a demarcation line on the outer periphery of the head 22. The demarcation line 30 on each head 22 corresponds generally to the boundary between the first portion 34 of the head 22, which is in contact with the layer of material 24, and the second portion 36 of the head 22 which is not in contact with the layer of material 24. Preferably, the demarcation lines 30 are located at the outermost periphery of the head 22. However, the demarcation lines 30 may be located anywhere on the periphery of the head 22. The demarcation lines 30 on the heads 22 of the mechanical fastener 10 are preferably generally parallel to one another. More preferably, the demarcation lines 30 on the heads 22 are generally parallel to the first major surface 14 of the substrate 12. As the layer of heated material 24 is compressed down onto the softened stem ends, depressions 66 are formed where the second major surface 28 of the layer of heated material 24 contacts the stem ends.

Figure 4:
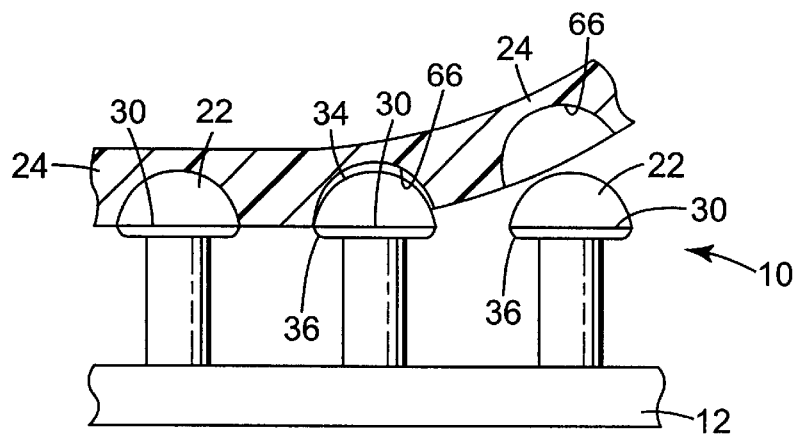
FIG. 4 illustrates stripping the layer of material from the intermediate article of FIG. 3 to reveal the mechanical fastener of the present invention.

As illustrated in FIG. 4, the layer 24 may be stripped from the substrate 12 and stems 20 to reveal a mechanical fastener 10 of the present invention. Preferably, layer 24 is stripped from the substrate 12 and stems 20 after cooling the layer of material 24 sufficiently to allow the heads 22 to generally maintain their shape. "Cooling" as used herein can be either active cooling, for example, with forced air, or allowing the article 48 to sit and cool. Stripping the layer of material 24 from the substrate 12 and stems 20 may occur either in line after the nip n prior to the windup roller 62, or may occur some time later. When layer 24 is stripped, a plurality of depressions 66 are revealed on the second major surface 28 of the layer of material 24. The depressions 66 correspond generally to the first major portion 34 of the convex heads 22. The layer of material 24 may then be ground up and reused in extruder 64.

Alternatively, it may be desirable to keep the layer of material 24, substrate 12 and stems melt bonded together as a composite article 48, as illustrated in FIG. 2. The melt bond may be permanent or temporary.

Figure 5:
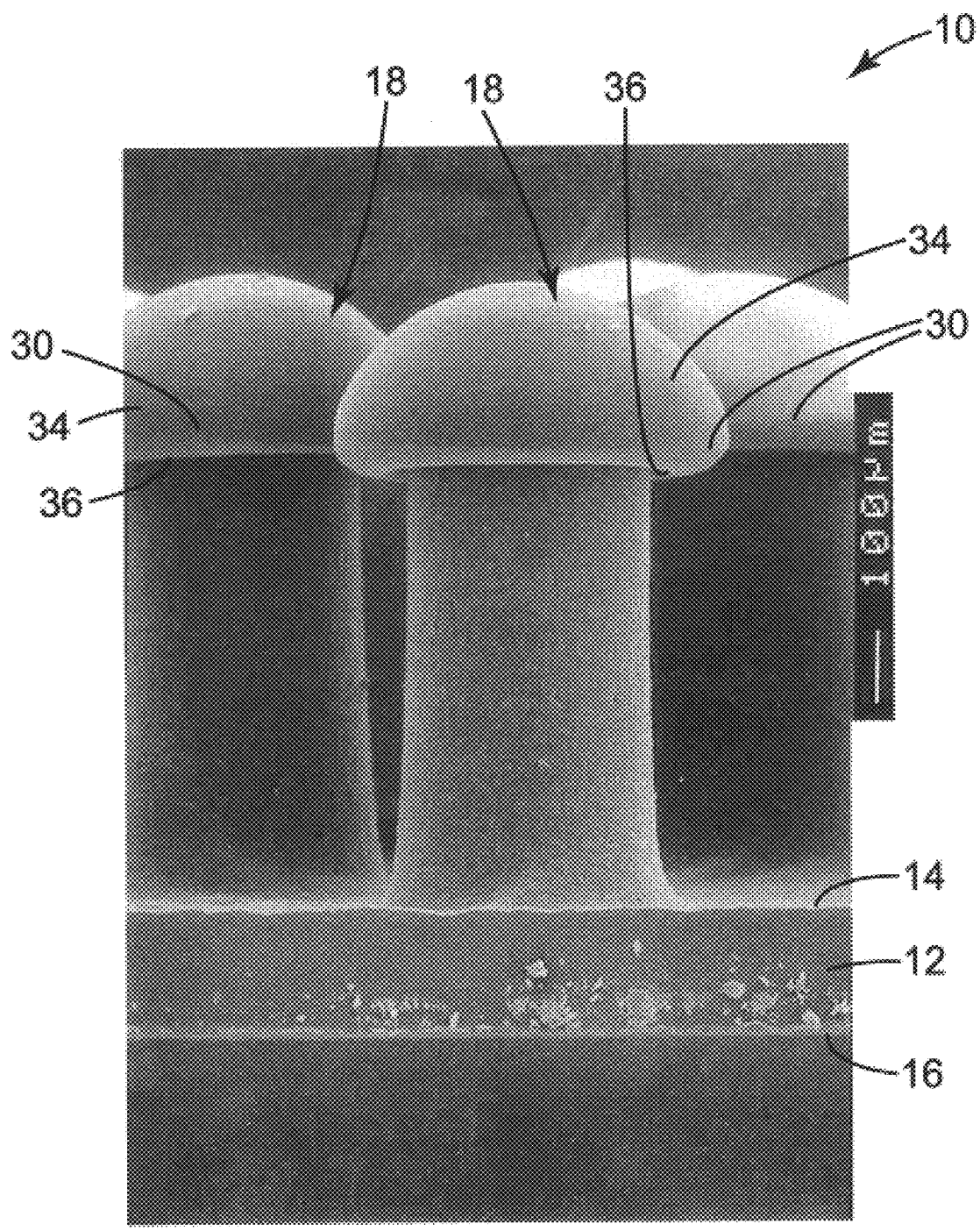
FIG. 5 is a digitally recorded micrograph showing a preferred embodiment of the mechanical fastener of the present invention.

FIG. 5 is a digitally recorded micrograph of a preferred embodiment of the mechanical fastener 10 of the present invention. This image was taken by a scanning electron microscope after the layer of material 24 was stripped from the mechanical fastener 10. Each head 22 includes a demarcation line 30. The demarcation line 30 indicates how far the layer of material 24 was pushed down onto the softened stem ends. As mentioned above, the demarcation line 30 on each head 22 is the boundary between the first portion 34 of the head 22, which was in contact with the layer of material 24, and the second portion 36 of the head 22, which was not in contact with the layer of material 24. In the illustrated embodiment, the demarcation lines 30 are located at the outermost periphery of the head 22. The demarcation lines 30 on the heads 22 of the mechanical fastener 10 are generally parallel to one another and generally parallel to the first major surface 14 of the substrate 12.

Figure 6:
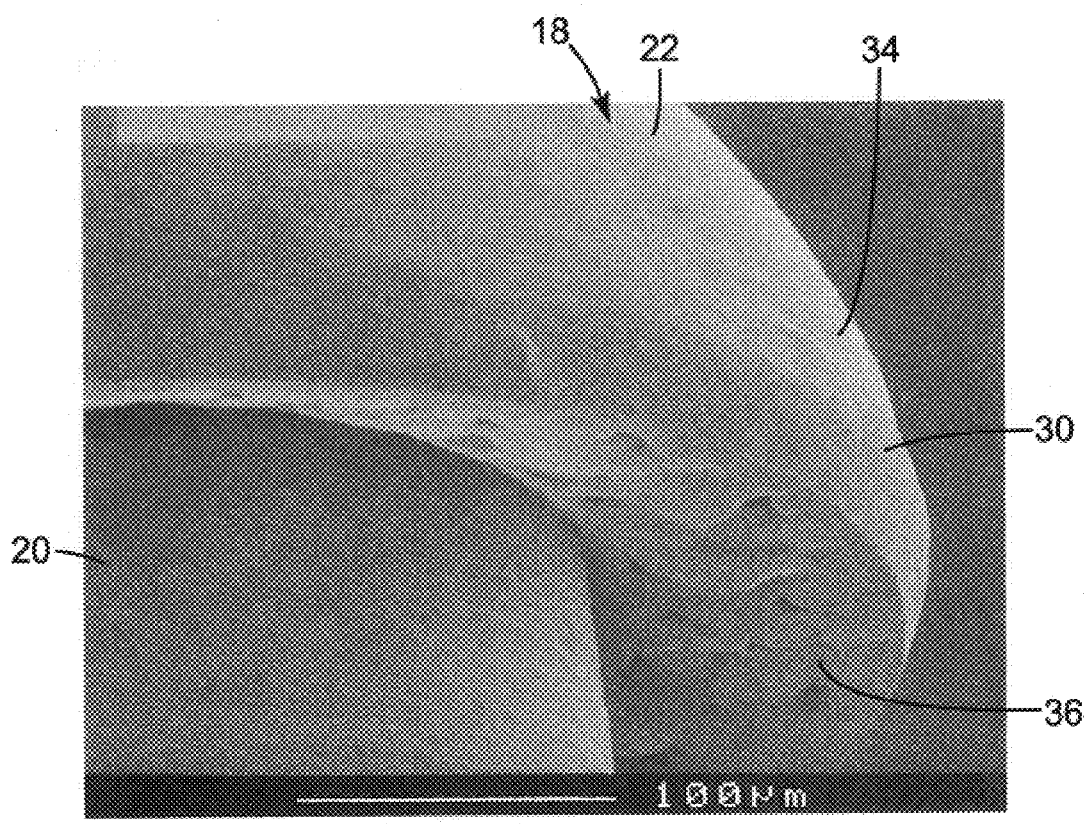
FIG. 6 is a digitally recorded micrograph showing a preferred head of the mechanical fastener.

FIG. 6 is a digitally recorded of a micrograph of a preferred head 22 of the mechanical fastener 10. This image was taken by a scanning electron microscope to illustrate the contrast in topography between the first portion 34 and the second portion 36 of the head 22. The first portion 34 is located at the top of the head 22 and the second portion 36 is located at the bottom of the head. The first portion 34 of the head 22, which was in contact the layer of material 24, has a smooth surface. The second portion 36 of the head 22, which did not contact the layer of material 24, has a rough surface. The first portion 34 of the head is visibly smoother than the second portion 36 of the head 22. The second portion 36 of the head 22 has many fissures and cracks in the surface. From this view, the fissures and cracks are approximately 10 microns wide. In contrast, the first portion 34 of the head 22 is smooth with no noticeable fissures or cracks. The demarcation line 30 is located on the outermost periphery of the convex head 22 and as a result, the entire convex surface of the head 22 is smooth.

Figure 7:
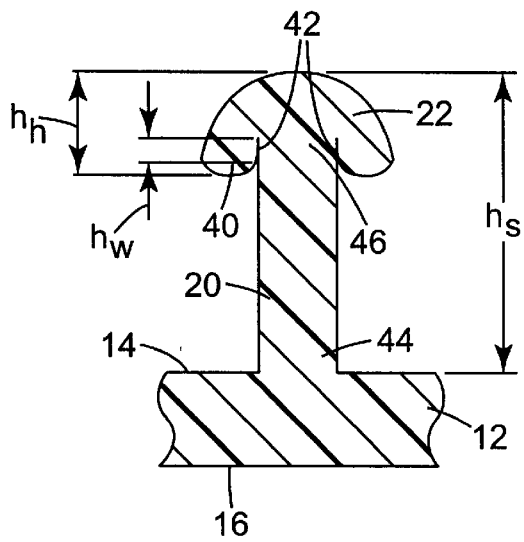
FIG. 7 is a cross-sectional view of a preferred engaging stem.

FIG. 7 illustrates a cross-section of an engaging stem 18, which is convenient for showing mutual wall 42. The stem 20 includes a base 44 attached to the first major surface 14 and a tip 46 opposite the stem base 44. The convex head 22 is attached to the tip 46 of the stem 20. The convex head 22 includes a lobe 40 adjacent the stem 20 thereby creating a mutual wall 42 between the lobe 40 and the tip 46 of the stem 20. The height $h_h$ of the convex head 22 is measured from the bottom of the lobe 40 to the top of the convex head 22. Preferably, the height $h_w$ of the mutual wall 42 is at least 5% of the height $h_h$ of the convex head 22.

Figure 9:
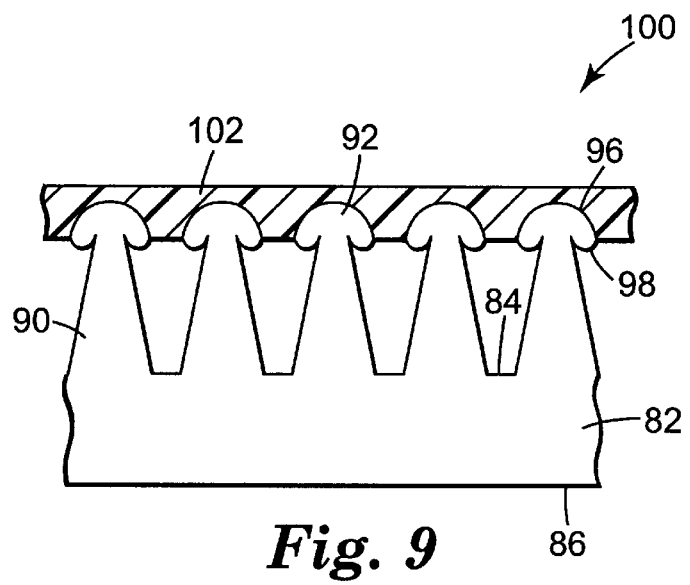
FIG. 9 is a partial cross-section of an intermediate article including the substrate and plurality of engaging ribs, and a layer of material.

One preferred embodiment of the method for making mechanical fastener 80 is illustrated by the following. The temperature of the first roll (similar to first roller 56 of FIG. 1), which contacts the substrate 82, can be set at 203° F. (95° C.). The temperature of the second roll (similar to roller 58 of FIG. 1) can be set at 159° F. (70.5° C.). The piston pressure holding the calendar rolls together should sufficient to compress the melt zone (about 100 lbs.(45.5 kg.)). The nip gap can be fixed at 0.065 in. (1.65 mm). The line speed can be 3 feet/minute (0.914 meter/minute). Just prior to the substrate 82 and ribs 90 entering the nip, 0.009 to 0.010 in. (0.229 mm to 0.254 mm) of a heated layer of material 102 of low density polyethylene polymer resin (LDPE, Melt Flow Index (MFI) 5.5, commercially available from Huntsman Corp., Houston, Tex. under the trade name Rexene 1058) can be extruded onto the tips of the ribs from an extruder at 500° F. (260° C.). The tips of the ribs 90 soften and result in convex ridges 92 being formed, as illustrated in FIG. 9. An intermediate article (similar to the intermediate article 100 of FIG. 9) is wound up on a winder roll. The extruded layer of material is later stripped to expose the mechanical fasteners having convex ridges 92.

Engaging stems 18 may be any desired height, cross section, or head shape. One preferred type of engaging stem is the engaging stem 18 illustrated in FIGS. 4–7, which includes a generally mushroom shaped head 22 and a stem 20 with a circular cross-section. Preferred heights $h_s$ of the engaging stems 18, measured from the first major surface 14 of substrate 12 to the top of the head 22, are in the range of 0.004 to 0.715 in. (0.010 to 1.816 cm.) More preferred heights of the engaging stems 18, measured from the first major surface 14 of substrate 12 to the top of the head 22, are in the range of 0.020 to 0.24 in. (0.0511 to 0.610 cm.) Most preferred heights of the stems 20, measured from the first major surface 14 of the substrate 12 to the top of the head 22 are in the range of 0.035 to 0.105 in. (0.089 to 0.267 cm.). Preferred heights $h_h$ of the heads 22 of the engaging stems 18, measured from the bottom of the lobe 40 of the head 22 to the top of the head 22, are in the range of 0.002 to 0.215 in. (0.005 to 0.546 cm.). More preferred heights of the heads 22 of the engaging stems 18, measured from the bottom of the lobe 40 of the head 22 to the top of the head 22, are in the range of 0.005 to 0.090 in. (0.013 to 0.229 cm.) Most preferred heights of the heads 22 of the engaging stems 18, measured from the bottom of the lobe 40 of the head 22 to the top of the head 22, are in the range of 0.010 to 0.030 in. (0.025 to 0.076 cm.). The heights of the engaging stems 18 may vary within a single mechanical fastener 10.

Preferred diameters of the stems 20 are in the range of 0.003 to 0.070 in. (0.008 to 0.178 cm.) More preferred diameters of the stems 20 are in the range of 0.005 to 0.025 in. (0.013 to 0.064 cm.) Most preferred diameters of the stems 20 are in the range of 0.008 to 0.016 in. (0.020 to 0.041 cm.). The stems may be cylindrical or tapered. Preferred diameters of the heads 20 at their outermost periphery are in the range of 0.005 to 0.150 in. (0.013 to 0.381 cm.) More preferred diameters of the heads 20 at their outermost periphery are in the range of 0.010 to 0.075 in. (0.025 to 0.191 cm.) Most preferred diameters of the heads 20 at their outermost periphery are in the range of 0.018 to 0.030 in. (0.046 to 0.076 cm.).

The number of engaging stems 18 in a given area may be any number, selected based on the desired use and the size of the engaging stems. One preferred density of engaging stems is in the range of 7 to 22959 stems/inch$^2$ (1 to 3560 stems/cm.$^2$). A more preferred density of engaging stems is in the range of 198 to 1768 stems/inch$^2$ (31 to 274 stems/cm.$^2$). A most preferred density of engaging stems is in the range of 285 to 804 stems/inch$^2$ (44 to 125 stems/cm.$^2$). The stiffness of the engaging stems 18 is related to the diameter, and height, and material of the stem 20. For stem diameters in the range of 0.012 to 0.016 in. (0.030 to 0.041 cm) and stem heights the range of 0.015–0.051 in. (0.038 to 0.0130 cm.), the flexural Modulus is preferably in the range of 25,000 to 2,000,000 psi (172,250 to 13,780,000 kPa). For a stem diameter of 0.014 in. (0.0356 cm) and a stem height of 0.037 in. (0.094 cm.) a more preferred flexural Modulus is approximately 200,000 psi (1,378,000 kPa).

The head density of fastener 10 is equal to the planar area occupied by heads 22 divided by the total area of the substrate 12. The head density may be selected based on the desired use. Preferably, the head density is selected such that engagement between a pair of fasteners 10 is possible, yet there is a sufficient density so that strong engagement is achieved. The head density for fastener 10 is preferably in the range of 14% to 45%. More preferably, the head density is in the range of 20% to 40%. Most preferably, the head density is in the range of 30% to 35%.

The engaging stems 18 may be located over the entire substrate 12 or over only a portion of the substrate 12 in any desired pattern or arrangement. One preferred arrangement of engaging stems 18 is disclosed in co-pending application "Mechanical Fastener," U.S. patent application Ser. No. 09/290,750, Attorney Docket No. 54700USA6A. filed on the same date herewith, which subsequently issued as U.S. Pat. No. 6,076,238.

Figure 8:
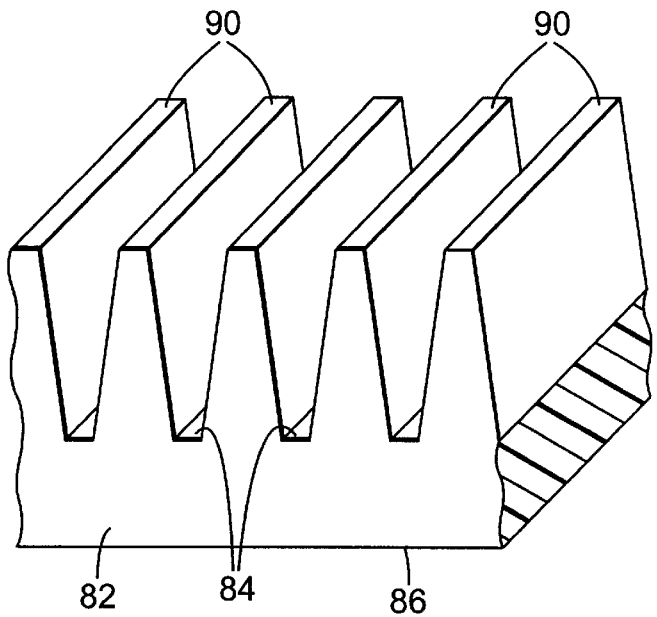
FIG. 8 is an isometric view of preferred embodiment of a substrate including a plurality of ribs.
Figure 10:
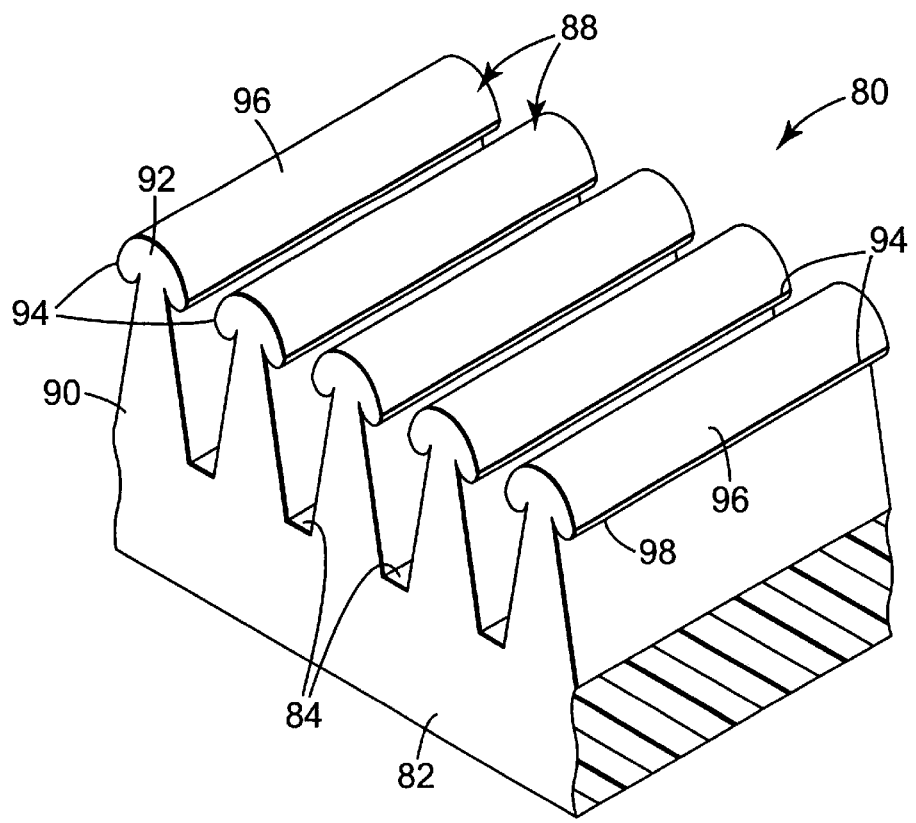
FIG. 10 is an isometric view of another preferred mechanical fastener including a plurality of engaging ribs including convex ridges.

FIGS. 8–10 illustrate an alternative mechanical fastener 80 and a preferred method of making the same. Mechanical fastener 80 is similar to the mechanical fastener 10 explained above, except fastener 80 includes a plurality of ribs 90 instead of a plurality of stems 20. FIG. 8 illustrates a substrate 82 including a plurality of ribs 90, which can be prepared as described in U.S. Pat. No. 4,875,259, "Intermeshable Article," (Appeldorn) the entire disclosure of which is incorporated herein by reference. The substrate 82 includes a first major surface 84 and a second major surface 86 opposite the first major surface 84. The substrate 82 and ribs 90 preferably comprise a polymeric material. More preferably substrate 82 and ribs 90 comprise a thermoplastic material.

Similar to the apparatus schematically illustrated in FIG. 1, the substrate 82 and ribs 90 is be fed through a nip formed by two calendar rolls. Just prior to entering the nip, a layer of heated material 102 is extruded onto the ribs 90 to soften the tips of the ribs 90. After being compressed by the nip, the softened tips of the ribs 90 are deformed into convex ridges 92, as illustrated in FIG. 9. Similar to the first and second portions 34, 36 of the heads 22 of the engaging stems discussed above, the convex ridges 92 also include a first portion 96 and second portion 98. The first portion 96 of the convex ridge 92 is in contact with the layer of heated material 102. The second portion 98 of the convex ridge 92 is not in contact with the layer of heated material 102.

As illustrated in FIG. 10, after the layer of material 102 is stripped, each of the convex ridges 92 includes a demarcation line 94. More preferably, each of the convex ridges 92 includes two demarcation lines 94 along the length of each convex ridge 92. The demarcation lines 94 are the boundaries between the first portion 96 and the second portion 98 of the convex ridge 92. Preferably, the two demarcation lines 94 on the convex ridge 92 are located opposite each other at the widest portion of the convex ridge 92. The demarcation lines 94 are generally parallel to one another. Preferably, demarcation lines 94 are generally parallel to the first major surface 84 of the substrate 82.

Engaging ribs 88 may be any desired height, cross section, or head shape. One preferred type of engaging rib is the engaging rib 88 illustrated in FIG. 10, which includes a convex ridge 92 and a rib 90 with a mushroom shaped cross-section. Preferred heights of the engaging ribs 90, measured from the first major surface 84 of substrate 82 to the top of the ridge 92, are in the range of 0.004 to 0.715 in. (0.010 to 1.816 cm.) Preferred widths of the ridges 92 at their outermost periphery are in the range of 0.005 to 0.150 in. (0.013 to 0.381 cm.).

As illustrated in FIG. 1, the unwind roller 50, idler roller 52 and idler roller 54 covey a substrate 12 including a plurality of stems 20 to a nip n formed between a first roller 56 and a second roller 58. The present invention is concerned with the method of extruding the layer of material to form the convex heads. The method of manufacturing the substrate 12 with the stems 20 is not critical. One suitable method of manufacturing the substrate 12 and plurality of stems 20 is disclosed in PCT publication WO 98/57564 (Kampfer), published on Dec. 23, 1998. This publication generally discloses a method of forming stems on a substrate using a preselected thermoplastic resin. The resin is fed by conventional means into an extruder, which melts the resin and moves the heated resin to a die. The die extrudes the resin as a wide ribbon of material onto a mold surface, such as a cylinder having an array of mold cavities in the form of elongated holes. The elongated holes may be located to provide the arrangement of stems in the present invention, for example by drilling the cylinder. Preferably, the elongated holes are tapered to facilitate removal of the solidified resin from the mold cavities. These holes or mold cavities are preferably in the form of straight (i.e., only one axis in the length direction) cavities. The mold cavities can be connected to a vacuum system to facilitate resin flow into the mold cavities. This could require a doctor blade or knife to remove excess material extruded into the interior face of the mold cylinder. The mold cavities preferably terminate in the mold surface having an open end for entry of the liquid resin and a closed end. In this case, a vacuum could be used to partially evacuate the mold cavities prior to entering the die. The mold surface preferably matches that of the die where they are in contact to prevent excess resin being extruded out, e.g., the die side edges. The mold surface and cavities can be air or water cooled, or the like, prior to stripping the integrally molded substrate and upstanding formed stems from the mold surface such as by a stripper roll. This provides a substrate having integrally formed stems of thermoplastic material. Other suitable methods are disclosed in U.S. Pat. No. 5,077,870, "Mushroom-Type Hook Strip for a Mechanical Fastener," (Melbye et al.), and PCT Application No. WO 94/23610, "Mushroom-Type Hook Strip for a Mechanical Fastener" (Miller et al.), published on Oct. 27, 1994. A suitable method of manufacturing the substrate 82 and ribs 90 is disclosed in U.S. Pat. No. 4,875,259 (Appeldorn).

The mechanical fasteners 10, 80 of the present invention can be produced in long, wide webs that can be wound up as rolls for convenient storage and shipment. The mechanical fastener material in such rolls can optionally have a layer of pressure-sensitive adhesive on the surface of the substrate opposite the engaging stems. Pieces of desired sizes of mechanical fastener can be cut from the roll of fastener material and adhesively or otherwise secured to articles to permit releasable attachment of an article to a second article or substrate.

The mechanical fasteners 10, 80 of the present invention can be engaged with itself, with the engaging stems of another mechanical fastener, or with a loop structure. The fastener of the invention can be used wherever hook and loop or headed fasteners are currently used such as for automotive, electronic, marine, transportation, point of purchase, and automotive aftermarket uses. For example, the mechanical fastener of the invention is useful for attachments such as an abrasive disk to a backup pad, access panels, automotive trim, seat covers, headliners, computer monitor covers, carpet, wall decorations, pictures, signage, and displays; closures such as envelopes, mailers, boxes, and pouches; and assemblies such as cell phones, computer printers, office furniture, office panels, toys, and picture frames.

Preferably, the substrate 12 and the engaging stems 18 of mechanical fastener 10 are integrally molded. Preferably, the substrate 82 and engaging ribs 88 of mechanical fastener 80 are integrally molded. The substrates 12, 82 and engaging stems and ribs 18, 88 may be made of any thermoplastic resin. Thermoplastic resins include polyesters such as poly (ethylene terephthalate); polyamides such as nylon; poly (styrene-acrylonitrile); poly(acrylonitrile-butadiene-styrene); polyolefins such as polypropylene, and polyethylene; polyurethanes; and plasticized polyvinyl chlorides. The thermoplastic resin may also comprise blends, including polypropylene and polyethylene blends. Copolymers of the foregoing resins can also be used. A preferred thermoplastic resin is a propylene polymer resin such as those available under the trade names Phillips HGZ-180 and Phillips HGX-030-01 from Phillips Sumika Polypropylene Company, Houston, Tex.

The substrates 12, 82 and engaging stems and ribs 18, 88 may also include one or more additives, including, but not limited to, powders such as fumed silica, talc, or clay; magnetic, electrically conductive, thermally conductive, electrically and thermally conductive, or nonconductive particulates, fibers; glass or polymeric hollow microspheres, glass or polymeric solid microspheres, expandable polymeric microspheres, antistatic agents, lubricants, wetting agents, flow control agents, tackifying resins, surfactants, pigments, dyes, colorants, coupling agents, plasticizers, and antioxidants.

Any thermoplastic resin may be used to produce the layer of material 24. Useful thermoplastic resins include polyolefins such as polypropylene, and polyethylene; polyesters such as poly(ethylene terephthalate); polyamides such as nylon; poly(styrene-acrylonitrile); poly(acrylonitrile-butadiene-styrene); polyurethanes, and plasticized polyvinyl chlorides. The thermoplastic resin may also comprise blends, including polypropylene and polyethylene blends. Copolymers of the foregoing resins can also be used. A preferred thermoplastic resin is a polyethylene polymer resin such as those available under the trade names Rexene 1058 from Huntsman Corp., Houston, Tex, and Lyondell M6020 from Lyondell Polymers, Houston, Tex.

The physical properties of the resins, such as melt flow index and viscosity, can be modified by adding tackifying resins, powders such as fiuned silica, talc, or clay; particulates; fibers; glass or polymeric hollow microspheres, glass or polymeric solid microspheres, lubricants, wetting agents, flow control agents, surfactants, pigments, dyes, colorants, coupling agents, plasticizers, and antioxidants.

The operation of the present invention will be further described with regard to the following detailed examples. These examples are offered to further illustrate the various specific and preferred embodiments and techniques. It should be understood, however, that many variations and modifications might be made while remaining within the scope of the present invention.

EXAMPLE 1

A substrate including a plurality of upstanding thermoplastic stems was prepared from a propylene polymer resin (commercially available from Phillips Sumika Polypropylene Company, Houston, Tex. under the trade name Phillips HGZ-180). The stem density was 705 stems/square inches (approximately 109 stems/square centimeters). The average height of the stems was approximately 62.5 mils (1.59 mm) and the diameter of the stems was approximately 14 mils (0.356 mm). The total height of the stems and substrate was 67 to 72 mils (1.70 mm to 1.83 mm).

The substrate and stems was fed through a nip formed by two steel calendar rolls. The temperature of the first calendar roller, which contacted the substrate, (similar to roller 56 of FIG. 1) was set at 203° F. (95° C.). The temperature of the second calendar roll (similar to roller 58 of FIG. 1) was set at 159° F. (70.5° C.). The piston pressure holding the calendar rolls together was sufficient to compress the melt zone (about 100 lbs. (45.5 kg.)). The nip gap was fixed at 65 mils (1.65 mm). The line speed was 3 feet/minute (0.914 meter/minute). Just prior to the substrate entering the nip, 0.009 to 0.010 in. (0.229 mm to 0.254 mm.) of a molten layer of low density polyethylene polymer resin (LDPE, Melt Flow Index (MFI) 5.5, commercially available from Huntsman Corp., Houston, Tex, under the trade name Rexene 1058) was extruded onto the tips of the stems from an extruder (positioned similarly to the extruder 64 of FIG. 1) at 500° F. (260° C.). The tips of the stems softened and resulted in smooth, mushroom-shaped heads being formed. The intermediate article (similar to the intermediate article 48 of FIG. 2) was wound up on a winder roll. The extruded layer of material was later removed to expose the mechanical fastener.

The head dimensions were measured in the machine direction and the cross web direction at three locations on the web. The average head dimension was 0.01995 in. (0.507 mm.) in the machine direction and 0.02111 in.(0.536 mm.) in the cross direction.

EXAMPLE 2

A substrate including a plurality of upstanding thermoplastic stems was prepared from a propylene polymer resin (commercially available from Phillips Sumika Polypropylene Company, Houston, Tex. under the trade name Phillips HGX-030-01, MFI 3.5). The average height of the stems was approximately 0.0695 in. (1.77 mm.). The diameter of the stems was approximately 0.014 in. (0.356 mm.), the total height of the stems and substrate was 0.072 in. (1.83 mm.).

The temperature of the first steel calendar roll (first roller 56 of FIG. 1) was set at 179° F. (81.5° C.). The temperature of the second steel calendar roll (second roller 58 of FIG. 1) was set at 185° F. (85° C.). The nip gap was fixed at 0.062 in. (1.57 mm.), and the line speed was 4 feet/minute (1.22 meters/minute). Just prior to the substrate entering the nip, 0.009 to 0.010 in. (0.229 mm to 0.254 mm.) of a molten layer of low density polyethylene polymer resin (LDPE, Melt Flow Index (MFI) 5.5, commercially available from Huntsman Corp., Houston, Tex, under the trade name Rexene 1058) was extruded onto the tips of the stems from an extruder (positioned similarly to the extruder 64 of FIG. 1) at 500° F. (260° C.). The tips of the stems softened and resulted in smooth, mushroom-shaped heads being formed. The intermediate article (similar to the intermediate article 48 of FIG. 2) was wound up on a winder roll. The extruded layer of material was later removed to expose the mechanical fastener.

The head dimensions were measured in the machine direction and the cross web direction at three locations on the web. The average head dimension was 0.0204 in. (0.158 mm.) in the machine direction and 0.0209 in. (0.531 mm.) in the cross direction.

EXAMPLE 3

A substrate including a plurality of upstanding thermoplastic stems was prepared as in Example 2, except that the following dimensions were different. The average height of the stems was approximately 0.0625 in. (1.59 mm.). The diameter of the stems was approximately 0.014 in. (0.356 mm.). The average total height of the stems and substrate was 0.0625 in. (1.59 mm). Approximately 0.009 to 0.010 in. (0.229 mm. to 0.254 mm.) of a heated layer of high density polyethylene polymer resin (HDPE, MFI 2.0, commercially available from Lyondell Polymers, Houston, Tex, under the trade name Lyondell M6020) was extruded onto the tips of the stems. The temperature of the first aluminum calendar roll (first roller 56 of FIG. 1) was set at 208° F. (98° C.). The temperature of the second aluminum calendar roll (second roller 58 of FIG. 1) was set at 153° F. (67° C.). The nip gap was fixed at 0.058 in. (1.47 mm.), and the line speed was 10 feet/minute (3.05 meters/minute).

The head dimensions were measured in the machine direction and the cross web direction at three locations on the substrate. The average head dimension was 0.0217 in. (0.551 mm.) in the machine direction and 0.0222 in. (0.564 mm.) in the cross direction.

The topography of the heads made above was tested using two samples of engaging stems. Samples for roughness measurements were taken from the first portion 34 of the head, which was in contact with the layer of material 24, and the second portion 36 of the head, which did not contact the layer of material (as illustrated in FIGS. 3–4). Microscopy tests were performed on the two samples by a Leica TCS 4D confocal scanner mounted on Leica DM RXE microscope supplied with its associated software (commercially available from Leica Microsystems Inc., located in Allendale, N.J.).

The samples were mounted on a microscope slide with double-sided tape. For each sample, a series of Confocal brightfield (CRB) (x,y) 100×/0.95 objective images were obtained as the sample was moved through focus. A topographic image was generated from the image series using the modified center-of-mass algorithm. The topographic images were then flatted using the "parabolic-flattening" macro. Surface roughness data was generated from the flattened images using the "roughness" macro. Surface data was obtained from first and second portions of the heads. The results are shown in Table 1 below.

TABLE 1

Surface Roughness Data

| Sample | Ra (arithmetical mean) ($10^{-6}$ m) | Rq (root-mean-square) ($10^{-6}$ m) | Rt (maximum peak to valley) ($10^{-6}$ m) |
| --- | --- | --- | --- |
| First Portion of the Head (Sample #1) | 0.059 | 0.081 | 1.234 |
| Second Portion of the Head (Sample #1) | 0.288 | 0.396 | 5.308 |
| First Portion of the Head (Sample#2) | 0.034 | 0.053 | 1.050 |
| Second Portion of the Head (Sample #2) | 0.311 | 0.421 | 5.022 |

As discussed above, the first portion of the head that was in contact with the layer of material is smoother than the second portion of the head that was not in contact with the layer of material.

The tests and test results described above are intended solely to be illustrative, rather than predictive, and variations in the testing procedure can be expected to yield different results.

The present invention has now been described with reference to several embodiments thereof. The foregoing detailed description and examples have been given for clarity of understanding only. No unnecessary limitations are to be understood therefrom. All patents and patent applications cited herein are hereby incorporated by reference. It will be apparent to those skilled in the art that many changes can be made in the embodiments described without departing from the scope of the invention. Thus, the scope of the present invention should not be limited to the exact details and structures described herein, but rather by the structures described by the language of the claims, and the equivalents of those structures.

What is claimed is:

1. A method of forming a mechanical fastener, comprising the steps of:
   a) providing a substrate including a first major surface and a plurality of stems extending from the first major surface of the substrate, wherein each of the plurality of stems includes a stem end;
   b) placing a layer of heated material on the stem ends to soften the stem ends;
   c) deforming the softened stem ends into convex heads and forming a plurality of depressions in the layer of heated material where the layer of heated material contacts the convex heads; and
   d) stripping the layer of material having the plurality of depressions therein.

2. The method of claim 1, wherein step c) includes compressing the layer of heated material and substrate to deform the softened stem ends into convex heads.

3. The method of claim 1, further comprising the step of cooling the layer of heated material prior to step d).

4. The method of claim 1, wherein step c) comprises deforming the softened stem ends around the plurality of stems to form a plurality of convex heads.

5. The method of claim 1, wherein the layer of material comprises polymeric material.

6. The method of claim 5, wherein the polymeric material comprises a thermoplastic material.

7. The method of claim 6, wherein the thermoplastic material comprises a polyolefin.

8. The method of claim 7, wherein the polyolefin comprises polypropylene.

9. The method of claim 7, wherein the polyolefin comprises polyethylene.

10. The method of claim 1, wherein the plurality of engaging stems and the convex heads comprise a polymeric material.

11. The method of claim 10, wherein the polymeric material is a thermoplastic material.

12. The method of claim 11, wherein the thermoplastic material is a polyolefin.

13. The method of claim 12, wherein the polyolefin comprises polypropylene.

14. A method of forming a mechanical fastener, comprising the steps of:
 a) providing a substrate including a first major surface and a plurality of stems extending from the first major surface of the substrate, wherein each of the plurality of stems includes a stem end;
 b) placing a layer of heated material on the stem ends to soften the stem ends; and
 c) deforming the softened stem ends into convex heads and compressing the layer of heated material and substrate between a nip formed between a first roller and a second roller to deform the softened stem ends into convex heads, wherein the first roller contacts the substrate opposite the first major surface, and wherein the second roller contacts the layer of heated material.

15. The method of claim 14, further comprising the step of:
 d) stripping the layer of material from the plurality of convex heads.

16. The method of claim 15, further comprising the step of cooling the layer of heated material prior to step d).

17. The method of claim 14, wherein the layer of material comprises polymeric material.

18. The method of claim 14, wherein the plurality of engaging stems and the convex heads comprise a polymeric material.

19. A method of forming a mechanical fastener, comprising the steps of:
 a) providing a substrate including a first major surface and a plurality of stems extending from the first major surface of the substrate, wherein each of the plurality of stems includes a stem end;
 b) placing a layer of heated material on the stem ends to soften the stem ends;
 c) deforming the softened stem ends into convex heads; and imparting a demarcation line on each of the convex heads.

20. The method of claim 19, wherein said convex head includes a first portion that contacts the layer of heated material and a second portion that does not contact the layer of heated material, and wherein the demarcation line on the convex head is at a boundary formed between the first portion and the second portion of the convex head.

21. The method of claim 20, further comprising the step of forming a plurality of depressions in the layer of heated material where the layer of heated material contacts the first portion of the convex heads.

22. The method of claim 19, wherein step c) includes compressing the layer of heated material and substrate to deform the softened stem ends into convex heads.

23. The method of claim 19, further comprising the step of:
 d) stripping the layer of material from the plurality of convex heads.

24. The method of claim 23, further comprising the step of cooling the layer of heated material prior to step d).

25. The method of claim 19, wherein the layer of material comprises polymeric material.

26. The method of claim 19, wherein the plurality of engaging stems and the convex heads comprise a polymeric material.

27. A method of forming a mechanical fastener, comprising the steps of:
 a) providing a substrate including a first major surface and a plurality of stems extending from the first major surface of the substrate, wherein each of the plurality of stems includes a stem end;
 b) extruding a layer of material on the stem ends to soften the stem ends; and
 c) deforming the softened stem ends into convex heads.

28. The method of claim 27, wherein step c) includes compressing the layer of heated material and substrate to deform the softened stem ends into convex heads.

29. The method of claim 27, further comprising the step of:
 d) stripping the layer of material from the plurality of convex heads.

30. The method of claim 29, further comprising the step of cooling the layer of heated material prior to step d).

31. The method of claim 27, wherein the layer of material comprises polymeric material.

32. The method of claim 27, wherein the plurality of engaging stems and the convex heads comprise a polymeric material.

33. A method of forming a mechanical fastener, comprising the steps of:
 a) providing a substrate including a first major surface and a plurality of ribs extending from the first major surface of the substrate, wherein each of the plurality of ribs includes a rib end;
 b) placing a layer of heated material on the rib ends to soften the rib ends; and
 c) deforming the softened rib ends into convex ridges and compressing the layer of heated material and substrate between a nip formed between a first roller and a second roller to deform the softened stem ends into convex heads, wherein the first roller contacts the substrate opposite the first major surface, and wherein the second roller contacts the layer of heated material.

34. The method of claim 33, further comprising the step of:
 d) stripping the layer of material from the plurality of convex ridges.

35. The method of claim 34, further comprising the step of cooling the layer of heated material prior to step d).

36. A method of forming a mechanical fastener, comprising the steps of:
 a) providing a substrate including a first major surface and a plurality of ribs extending from the first major surface of the substrate, wherein each of the plurality of ribs includes a rib end;
 b) placing a layer of heated material on the rib ends to soften the rib ends;
 c) deforming the softened rib ends into convex ridges; and imparting a demarcation line on each of the convex ridges.

37. The method of claim 36, wherein step c) includes compressing the layer of heated material and substrate to deform the softened rib ends into convex ridges.

38. The method of claim 36, further comprising the step of:

d) stripping the layer of material from the plurality of convex ridges.

39. The method of claim 38, further comprising the step of cooling the layer of heated material prior to step d).

40. A method of forming a mechanical fastener, comprising the steps of:

a) providing a substrate including a first major surface and a plurality of ribs extending from the first major surface of the substrate, wherein each of the plurality of ribs includes a rib end;

b) extruding a layer of material on the rib ends to soften the rib ends; and c) deforming the softened rib ends into convex ridges.

41. The method of claim 40, wherein step c) includes compressing the layer of heated material and substrate to deform the softened rib ends into convex ridges.

42. The method of claim 40, further comprising the step of:

d) stripping the layer of material from the plurality of convex ridges.

43. The method of claim 42, further comprising the step of cooling the layer of heated material prior to step d).

\* \* \* \* \*

UNITED STATES PATENT AND TRADEMARK OFFICE
CERTIFICATE OF CORRECTION

PATENT NO.     : 6,303,062 B1
DATED          : October 16, 2001
INVENTOR(S)    : Aamodt, Jennifer M.

It is certified that error appears in the above-identified patent and that said Letters Patent is hereby corrected as shown below:

Column 3,
Line 26, "potion" should read -- portion--;

Column 6,
Line 22, "80to 200ºF." should read -- 80 to 200ºF. --;
Line 26, "fmal" should read -- final --;
Line 28, "temperatureofthe" should read -- temperature of the --;

Signed and Sealed this

Eleventh Day of June, 2002

*Attest:*

JAMES E. ROGAN
*Attesting Officer*  *Director of the United States Patent and Trademark Office*